Patented June 7, 1932

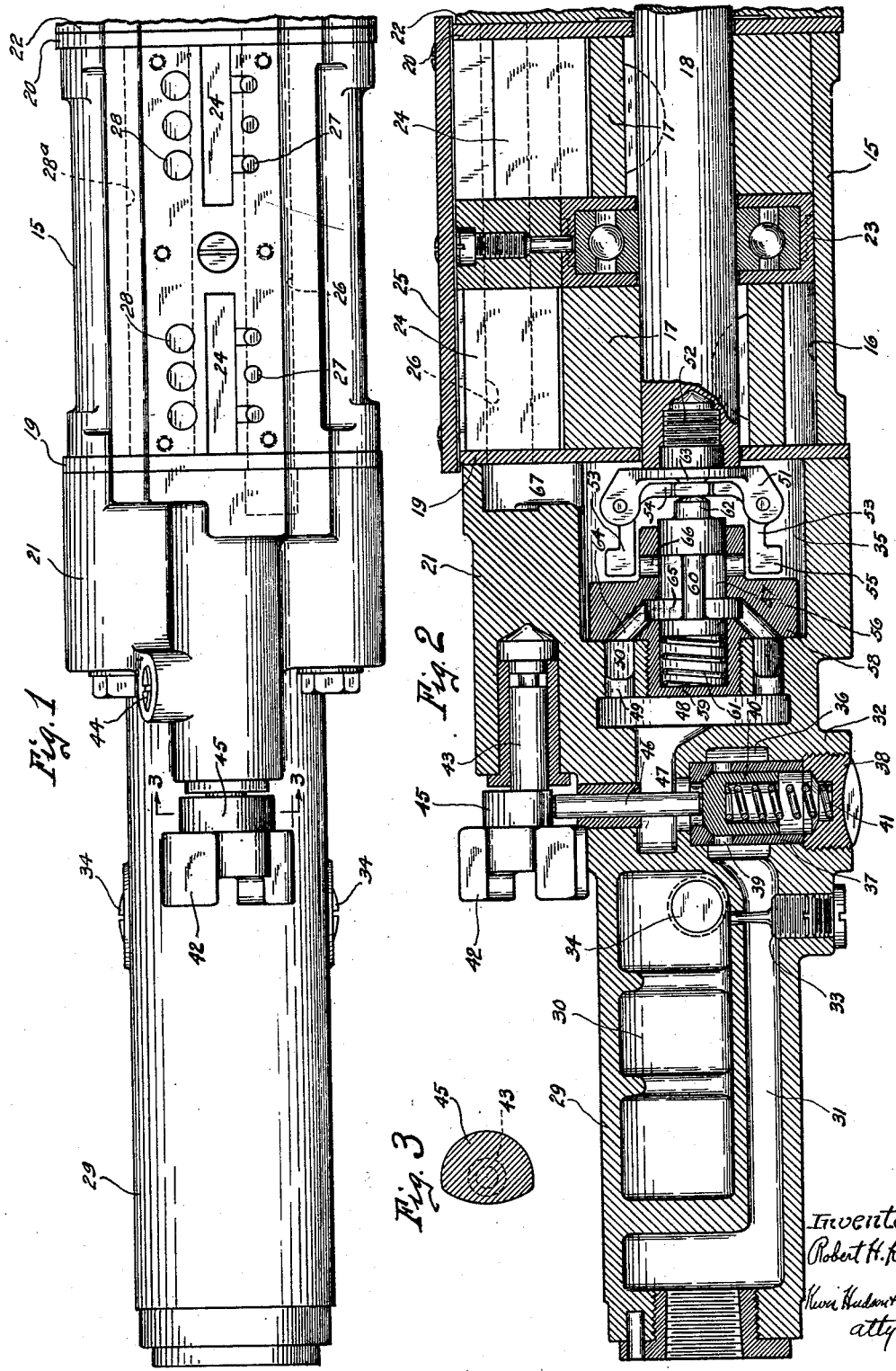

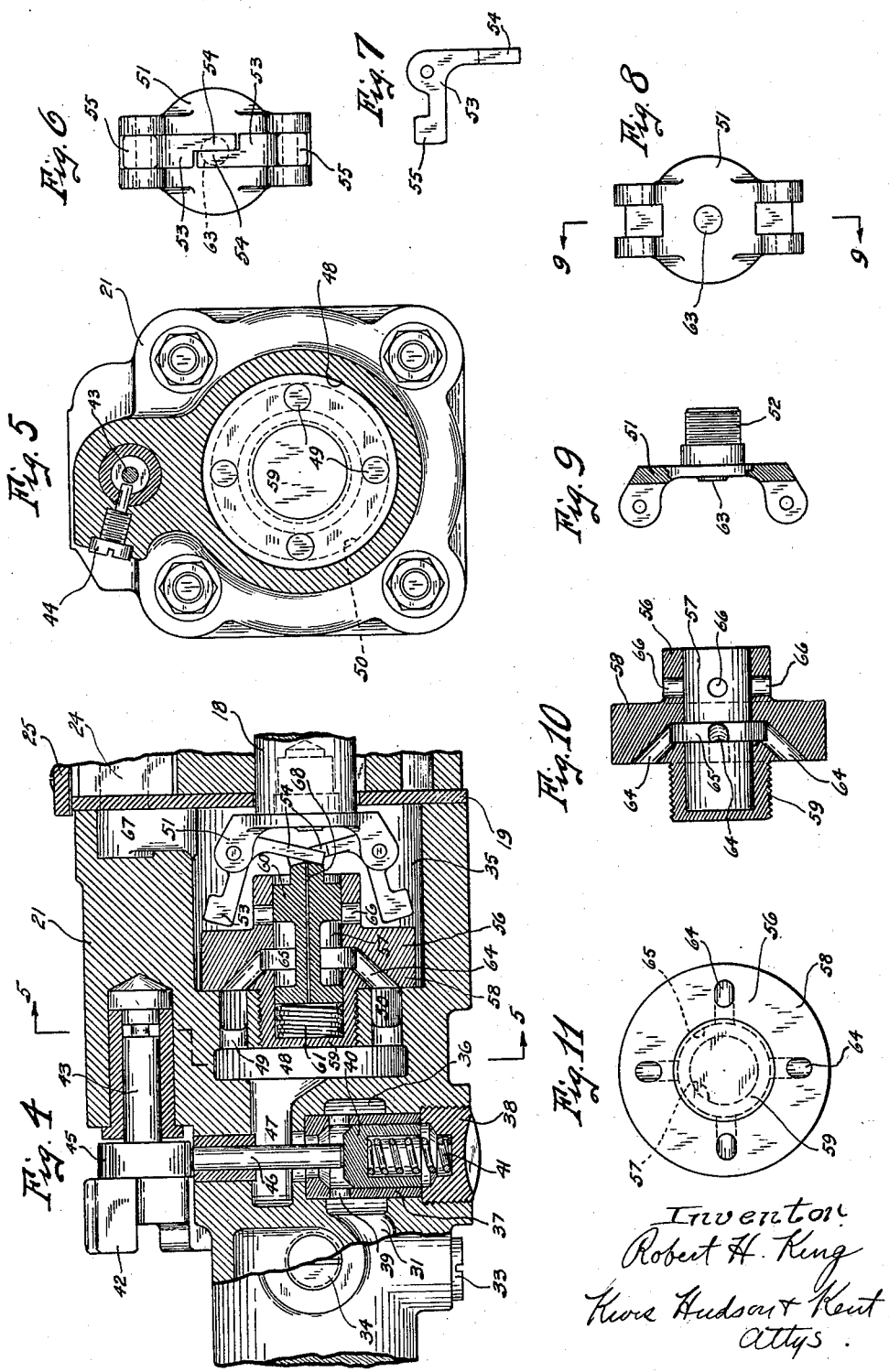

1,862,223

UNITED STATES PATENT OFFICE

ROBERT H. KING, OF CLEVELAND HEIGHTS, OHIO, ASSIGNOR TO THE ROTOR AIR TOOL COMPANY, OF CLEVELAND, OHIO, A CORPORATION OF OHIO

GOVERNOR CONTROLLED FLUID PRESSURE TOOL

Application filed February 5, 1930. Serial No. 426,024.

This invention relates to a governor controlled fluid pressure tool, of the portable type and has for its chief object to provide a tool having as a part thereof a governor which is very sensitive in operation and effectively seals ports against leakage of the pressure fluid.

Further, the invention aims to provide a structure wherein the governor thereof is balanced so far as the fluid pressure is concerned. That is to say, the arrangement is such that the valve member is not affected in its movements by the pressure of the fluid and the governor weights in their action are not required to work against the pressure of the fluid.

A further object is to provide means for securing a dash-pot or dampening action on the valve member so as to avoid rapid minor vibrations as the speed of the motor changes.

A still further object is to provide a construction which is inexpensive and can be readily assembled and disassembled.

Finally, it might be stated that it is one of the objects to provide a structure of the character stated which is efficient in the control of the fluid and as regards the flow of fluid through the tool to and from the governor chamber and which is satisfactory and reliable in operation as well as from the assembly and cost standpoints.

The invention may be further briefly summarized as consisting in certain novel combinations and arrangements of parts and details of construction which will be described in the specification and set forth in the appended claims.

In the accompanying sheets of drawings, Fig. 1 is a plan view of a portion of a fluid pressure motor equipped or constructed in accordance with my invention, the top plate shown in Fig. 2 being removed; Fig. 2 is a vertical longitudinal section of the same; Fig. 3 is a detail sectional view through a detail of the manually controlled valve, the section being taken substantially along the line 3—3 of Fig. 1; Fig. 4 is a fragmentary sectional view similar to Fig. 2 but with the parts of the governor and of the manually controlled valve in different relative positions than illustrated in Fig. 2; Fig. 5 is a transverse sectional view substantially along the line 5—5 of Fig. 4; Fig. 6 is a detached end view of one of the units of the governor, this being the unit carrying the governor weights and which is normally carried by the spindle; Fig. 7 is a detached side view of one of the weights; Fig. 8 is a detached view of the support for the governor weights; Fig. 9 is a sectional view of the same substantially along the line 9—9 of Fig. 8; Fig. 10 is a detached sectional view of a part of the valve unit of the governor, the part shown being the support for the valve; and Fig. 11 is an end view of the same looking toward the right of Fig. 10.

The motor proper may be and preferably is similar to that illustrated in the Van Hamersveld and Cook Patent No. 1,653,748, granted December 27, 1927. This motor includes a cylinder body or housing 15 with a cylindrical bore 16 extending from end to end thereof forming cylinders for a pair of eccentric pistons 17 secured to the motor spindle 18. At opposite ends of the cylinder body are end plates 19 and 20 and engaging the end plates and secured thereto and to the cylinder body are a pair of handle members or end brackets 21 and 22. The handle member 21, through which the motive fluid (preferably compressed air) is supplied to the motor, is involved in the present invention, and, accordingly, it is shown in detail, whereas the handle member 22 is not directly involved and only a portion thereof is shown. It will be sufficient to state that the spindle 18 may extend through the handle member 22 and may have a bearing therein as well as having a center bearing 23 in the cylinder body. It also projects through the end plate 19 and slightly into a chamber of the handle member 21 as will be subsequently explained.

The cylinder body has a lateral extension provided with two guideways for sliding abutment blades 24, the outer ends of the guideways being closed by a removable cover plate 25. Main inlet and exhaust passageways extending from end to end through the cylinder body are provided on opposite sides of the guideways and abutment blades, the inlet passageway being shown at 26. Fluid pressure supplied to this passageway 26 is conveyed to the cylinder bore opposite both the eccentrically mounted pistons 17, through auxiliary passageways 27 which extend from the outer face of the lateral extension (beneath the cover plate 25) to the cylinder bore and intersecting the passageway 26. Similarly formed passageways 28 intersect the main exhaust passageway 28a for conveying away from the motor the exhaust fluid. While I have described in some detail the features of the motor, I wish it to be understood that these details are not essential to the invention for the motor proper may be otherwise constructed.

The handle member 21 has an outer portion 29 which is to be grasped by one of the hands of the operator when the tool is being used. This portion contains a chamber 30 for lubricant and it also has a passageway 31 for the pressure fluid extending from the outer end of this portion of the handle to valve mechanism formed in an enlarged portion 32 of the handle next to the motor proper. An adjustable needle valve 33 controls the flow of lubricant from the chamber 30 to the passageway 31, lubricant being supplied to the chamber 30 through one or more filling plugs indicated at 34.

In the enlarged portion 32 of the handle 21 there is provided next to the end plate 19 and cylinder body of the motor a governor chamber 35 which receives a governor including the weight unit and the valve unit to be referred to, and between the passageway 31 extending through the reduced part of the handle and the governor chamber 35 is a manually controlled valve which I find is very effective, particularly in connection with the governor, one of the advantages of this valve over that shown, for example, in the Van Hamersveld Patent No. 1,674,579, granted June 19, 1928, being reduction in the length of the fluid path from the supply passageway 31 through the manually controlled valve to the governor chamber, the present construction having the advantage of less fluid friction and, therefore, loss of pressure. The inner end of the supply passageway 31 terminates in an annular space 36 which surrounds a stationary valve sleeve 37 which is fitted into a seat formed in the lower portion 32 of the handle and is held in place by a screw plug 38. In the cylindrical portion of this valve sleeve 37 are formed a series of ports 39 which are adapted to be closed to shut off the supply of fluid pressure and to be opened to allow the motive fluid to pass to the governor and to the motor, by a valve in the form of a plunger 40 which is adapted to seat against the upper portion of the sleeve 37, being biased toward that position by a spring 41 engaging the screw plug 38 and extending into a hollow portion of the plunger. When this movable valve member is seated, the ports 39 are entirely closed.

The valve is controlled manually by a valve operating member 42 which is at the inner end of and above the reduced portion of the handle 21. This valve operating member has a stem 43 extending into a socket of the enlarged portion of the handle, and this stem has near its inner end a groove which receives the end of a holding screw 44 (see Fig. 5). This valve operating member is so located that it can be conveniently manipulated by the thumb of the operator's hand which grasps the handle 29. Just inwardly of the outer part of the operating member the latter has a cam-shaped portion 45 (see Fig. 3) which is engaged by a pin 46 extending inwardly or downwardly and at its lower end engaging the upper end of the movable valve plunger 40, as clearly shown in Figs. 2 and 4. In Fig. 2 the valve plunger 40 is shown in its closed position shutting off the supply of fluid to the governor and motor, the spring 41 not only holding the valve plunger 40 in closed position but also holding the pin 46 up against the cam member 45, the pin now engaging the relatively flat portion of the latter. In Fig. 4 the valve plunger 40 has been lowered so as to open the ports 39, the upper end of the pin now being engaged by the circular portion of the cam member 45.

When the valve is in its open position, the motive fluid passes through the ports 39 into the sleeve 37 and out through the top of the latter by way of an opening through which the lower end of the pin 46 freely extends. From this opening the motive fluid passes to a passageway 47 which is above the valve plunger 40 and its sleeve, this passageway leading into an annular chamber 48 the annular form of which is shown in the sectional view of Fig. 5. From this annular chamber a series of ports 49, in this instance four ports, lead forwardly to an annular groove 50 formed in that wall of the governor chamber 35 which is opposite or outwardly from the inner wall formed by the end plate 19.

I will next describe the governor which is located in the governor chamber 35 and which per se and in association with the other parts already described constitute the present invention. This governor may be said to be composed of two units, one the governor weight unit and the other the governor valve unit. The weight unit consists of a weight supporting member 51 having a threaded shank 52 which is adapted to be screwed into an opening in the inner end of the spindle 18, the body portion of the support being inside the governor chamber 35. The support has two pairs of ears diametrically opposite each other, as best shown in Figs. 6 and 8, and pivotally supported in these ears are two governor weights 53 which in this instance are in the form of bell-cranks with inner valve actuating fingers 54 and outer weighted portions 55 which respond to centrifugal action to cause the inner portions to actuate the valve. The inner portions of the two fingers 54 overlap at the center of the unit, as shown in Fig. 6, each having a notched or offset portion to accommodate the offset portion of the other finger.

The valve unit of the governor is stationarily mounted. It includes a valve supporting member 56 having an interior cylindrical chamber 57 with an outwardly projecting flange 58 on the rear side of which is an exteriorly threaded portion 59. This portion is adapted to be screwed into a threaded opening formed in the rear wall of the governor chamber 35 just inside of the annular passageway 50 to which the ports 49 lead, as already stated. When the support 56 is screwed into place, the rear side of the flange 58 tightly engages the rear wall of the governor chamber 35, as shown in Figs. 2 and 4.

Slidably mounted in the cylindrical chamber 57 of the valve support 56 is an annular or cylindrical valve 60 which fits the bore of the chamber 57, this valve having between its ends an annular groove forming in effect at the ends of the valve two disk-like portions which have sliding engagements with the bore of the chamber. At the rear of the valve there is a light spring 61 located in the hollow exteriorly threaded portion 59 of the valve support 56 which spring bears against the rear end of the valve 60 and holds an extension 62 at the forward end of the valve in engagement with the central point of the overlapping portions of the fingers 54 of the governor weights 53. When the weights are in their innermost position shown in Fig. 2, the fingers 54 may engage a suitable stop 63 at the center of the weight supporting member 51, the weights being shown in substantially their outermost position in Fig. 4. The motive fluid which passes through the governor and is supplied to the motor proper is with the present arrangement admitted to the chamber 57 of the valve support and passes from this chamber under control of the valve 60 which in turn is actuated by the governor weights. To bring this about, I provide in the flange 58 of the valve support 56 ports 64, in this instance four in number, which ports extend from the rear face of the flange where they in effect lead from the inlet groove 50 in the handle 21 diagonally downwardly and forwardly to the chamber 57 where they terminate in an annular groove 65 which at all times lies between the enlarged ends of the valve 60. Forwardly of the annular groove 65 are a series of outlet ports 66, preferably four in number, the inner ends of which ports are adapted to be covered and uncovered by the forward end of the valve 60, see Figs. 2 and 4. Regardless of the position of the valve 60, fluid pressure is admitted to the groove between the ends of the valve (as long as the manually operable valve 40 is open) so that the fluid pressure on both ends of the valve is the same, thus providing a balanced valve structure in so far as the fluid pressure is concerned. To obtain the full measure of balance in so far as fluid pressure is concerned, the space at the rear of the valve 60 may be placed in communication with the governor chamber so that not only is the live pressure on the two faces of the interior of the valve the same, but the pressure existing in the governor chamber will be exerted uniformly on both outer ends of the valve. The equalization of pressure on the outer ends of the valve may be obtained by providing a small passageway 68 centrally through the valve from one end to the other (see Fig. 4). Inasmuch as there will be a slight flow of fluid to or from the space behind the valve as the valve is actuated or moved axially by the governor weights or by the spring 61, this arrangement provides a dampening action for the valve which is highly desirable to prevent minor rapid vibrations as the speed of the motor is changed, due to variable load conditions.

When the weights are in their innermost position and the valve 60 is, therefore, in its forwardmost position shown in Fig. 2, the outlet ports 66 are uncovered and as the weights move outwardly as the speed of the motor increases, the valve is gradually moved rearwardly and the outlet ports 66 are more or less closed, being almost entirely closed when the weights are in their outermost position as indicated in Fig. 4, the parts being in the position shown in this figure when the motor is operating at its idling speed.

From the governor chamber 35 the motive fluid which has passed through the governor passes by way of a passageway 67 formed in the inner face of the handle 21 to the main inlet passageway 26 in the cylinder body and hence to the cylinder portions of the body proper.

In the assembly of the tool, the weight unit of the governor is screwed into the end of the spindle before the handle 21 is applied and the valve unit of the governor is screwed into the rear wall of the governor chamber formed in the handle, and when the handle is applied and fastened in place, the two units of the governor come into their proper working relationship. Should wear occur, the governor is readily accessible by simply removing the handle, making it possible, if necessary, to readily replace either unit of the governor with a new unit.

Furthermore, inasmuch as the rear wall of the flange 58 of the valve 56 fits tightly against the rear wall of the governor chamber and inasmuch as the ends of the valve 60, which, in itself, can be a hardened member, have a close fit in the chamber 57 of the valve support, the governor is well sealed against leakage, practically no motive fluid passing to the governor chamber and hence to the motor except by way of the ports 66.

It will be understood, of course, that when the manually operable valve is closed there is no flow of motive fluid past this valve to the governor but when the operator rocks the valve actuator 42 the pin 46 and plunger valve 40 are lowered, uncovering the ports 39 and allowing the motive fluid to pass through the ports upwardly into the space or passageway 47 and directly from the latter to the annular chamber 48 and by way of the ports 49, groove 50 and ports 64 to the interior of the governor valve so as to provide very little if any loss of pressure by friction of the fluid in its passage to and from the governor.

While I have shown the preferred construction and one which operates very effectively in the attainment of the objects stated at the beginning of the specification, I do not desire to be confined to the precise details shown as modifications in construction and arrangement may be made in the parts without departing from the spirit of the invention, and in the appended claims I aim to cover all such changes and modifications.

Having thus described my invention, I claim:

1. A portable fluid pressure tool comprising a motor having a rotatable spindle, a handle attached to one end of the motor and having an enlarged portion adjacent said motor which portion is provided with a fluid chamber and a passageway leading from said chamber to said motor, a support arranged in said chamber and detachably carried by said handle, a slidable governor valve in said support for controlling the flow of motive fluid to the motor, and detachable centrifugally operated means on said spindle and located in said chamber for actuating said governor valve.

2. In a portable pressure tool, a motor having a rotatable spindle, a handle attached to said motor and having an enlarged portion adjacent said motor, said enlarged portion being provided with a pair of fluid chambers spaced longitudinally of the handle one of which has an annular groove in the end wall thereof adjacent to the other chamber and the other of which is provided with a plurality of circumferentially spaced passages in its corresponding end wall and communicating with said annular groove, a threaded opening extending between the chambers and surrounded by said passages and said groove, a support arranged in said first mentioned chamber and having a threaded extension screwed into said opening and being provided with a valve receiving bore and a plurality of passages leading from said bore and communicating with said annular groove, said support also having ports communicating with said first mentioned chamber, a slidable governor valve arranged in said bore of said support for controlling the size of the openings of said last named ports, and detachable centrifugally operated means arranged on the motor spindle within said first mentioned chamber for actuating said valve, said enlarged portion of the handle having a passage leading from said first mentioned chamber to the motor.

In testimony whereof I hereunto affix my signature.

ROBERT H. KING.